US010662875B2

(12) United States Patent
Lafargue et al.

(10) Patent No.: US 10,662,875 B2
(45) Date of Patent: May 26, 2020

(54) PROPULSION UNIT WITH SELECTIVE COUPLING MEANS

(71) Applicant: SAFRAN HELICOPTER ENGINES, Bordes (FR)

(72) Inventors: Olivier Lafargue, Pontacq (FR); Didier Chartrain, Gomer (FR); Camel Serghine, Boeil-Bezing (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 251 days.

(21) Appl. No.: 15/528,136

(22) PCT Filed: Nov. 24, 2015

(86) PCT No.: PCT/FR2015/053180
§ 371 (c)(1),
(2) Date: May 19, 2017

(87) PCT Pub. No.: WO2016/083720
PCT Pub. Date: Jun. 2, 2016

(65) Prior Publication Data
US 2017/0321601 A1    Nov. 9, 2017

(30) Foreign Application Priority Data
Nov. 27, 2014   (FR) ...................................... 14 61585

(51) Int. Cl.
*B64D 27/10* (2006.01)
*F01D 15/10* (2006.01)
(Continued)

(52) U.S. Cl.
CPC .............. *F02C 6/206* (2013.01); *B64D 27/10* (2013.01); *B64D 27/24* (2013.01); *B64D 31/14* (2013.01);
(Continued)

(58) Field of Classification Search
CPC ........ B64D 27/10; B64D 27/24; B64D 31/14; B64D 35/02; F02C 6/206; F01D 15/10; Y02T 50/62
(Continued)

(56) References Cited

U.S. PATENT DOCUMENTS 2,474,143 A * 6/1949 Forsyth ..................... F02C 6/20
416/94
4,446,696 A * 5/1984 Sargisson ................ F02C 6/206
60/226.3
(Continued)

FOREIGN PATENT DOCUMENTS

| EP | 2 128 389 A2 | 12/2009 |
| EP | 2 226 487 A2 | 9/2010 |
| WO | 2104/131914 A1 | 9/2014 |

OTHER PUBLICATIONS

International Search Report dated Feb. 23, 2016 in PCT/FR2015/053180 filed Nov. 24, 2015.
(Continued)

*Primary Examiner* — Christopher P Ellis
(74) *Attorney, Agent, or Firm* — Oblon, McClelland, Maier & Neustadt, L.L.P.

(57) ABSTRACT

A propulsion unit, notably for an aircraft, including a turbomachine; a propeller that can be selectively coupled to the turbomachine; a rotary electrical machine able to drive at least the turbomachine, and selective coupling of the rotary electric machine to the propeller and/or the turbomachine that is able to couple only the propeller to the rotary electrical machine during a defined stage of operation of the propulsion unit and that is able to couple or not couple the rotary electric machine to a gas generator and/or a free turbine of the turbomachine.

8 Claims, 3 Drawing Sheets

(51) Int. Cl.
*F02C 6/20* (2006.01)
*B64D 35/08* (2006.01)
*F02K 5/00* (2006.01)
*B64D 27/24* (2006.01)
*B64D 31/14* (2006.01)
*B64D 35/02* (2006.01)
*F02C 7/268* (2006.01)
*F02K 3/06* (2006.01)

(52) U.S. Cl.
CPC ............. *B64D 35/02* (2013.01); *B64D 35/08* (2013.01); *F01D 15/10* (2013.01); *F02C 7/268* (2013.01); *F02K 3/06* (2013.01); *F02K 5/00* (2013.01); *Y02T 50/62* (2013.01)

(58) Field of Classification Search
USPC .......................................................... 244/60
See application file for complete search history.

(56) References Cited

U.S. PATENT DOCUMENTS

| | | | | |
|---|---|---|---|---|
| 2006/0260323 | A1* | 11/2006 | Moulebhar | F01D 21/003 60/793 |
| 2007/0151258 | A1* | 7/2007 | Gaines | F02C 7/36 60/792 |
| 2009/0145998 | A1* | 6/2009 | Salyer | B64C 27/04 244/17.23 |
| 2009/0289456 | A1* | 11/2009 | McLoughlin | F01D 15/10 290/46 |
| 2009/0293494 | A1* | 12/2009 | Hoffjann | B64D 27/02 60/780 |
| 2009/0322088 | A1* | 12/2009 | Dooley | F02C 7/275 290/46 |
| 2010/0219779 | A1* | 9/2010 | Bradbrook | F02C 3/113 318/153 |
| 2010/0327109 | A1* | 12/2010 | Dooley | F01D 15/10 244/50 |
| 2013/0038057 | A1 | 2/2013 | McLoughlin et al. | |
| 2014/0283519 | A1* | 9/2014 | Mariotto | F02C 7/36 60/698 |
| 2014/0346283 | A1* | 11/2014 | Salyer | B64C 37/00 244/7 A |
| 2015/0274306 | A1* | 10/2015 | Sheridan | F02C 7/36 60/772 |
| 2016/0167799 | A1* | 6/2016 | Smaoui | F02C 6/12 |
| 2017/0225573 | A1* | 8/2017 | Waltner | B64C 27/12 |
| 2017/0320584 | A1* | 11/2017 | Menheere | B64D 27/10 |
| 2018/0187604 | A1* | 7/2018 | Poumarede | B64D 35/08 |
| 2018/0370641 | A1* | 12/2018 | Dindar | B64D 27/10 |

OTHER PUBLICATIONS

French Search Report dated Sep. 25, 2015 in FR1461585 filed Nov. 27, 2014.

* cited by examiner

PROPULSION UNIT WITH SELECTIVE COUPLING MEANS

TECHNICAL DOMAIN

The invention relates to a propulsion unit such as a turboprop that is made so as to limit its fuel consumption, particularly during taxiing steps of the aircraft on which the propulsion unit is installed.

STATE OF PRIOR ART

The step during which an aircraft is moving or is waiting in an airport before or after takeoff is calling the taxiing step.

This step usually takes 10 to 20 minutes, depending on the size of the airport.

A conventional turboprop comprises mainly a turbomachine that generates driving power and an external propeller driven by the turbomachine that provides the driving force for displacement of the aircraft.

During the taxiing step, the turbomachine is permanently running, both when the aircraft is moving and during waiting steps for example while waiting for takeoff.

Thus, a large quantity of fuel is consumed during this taxiing step, although energy needs from the turbomachine are limited.

For example, for an aircraft with about 70 seats, the consumed quantity of fuel can exceed 50 kilograms for a taxiing step lasting more than 10 minutes. The turbomachine consumes fuel and produces exhaust gases during this operation on the ground. Since the aircraft speed is very low, the plume of exhaust gases is hardly diluted by the surrounding air. The exhaust gases are then distributed around the entire airport platform, to the detriment of airport personnel and passengers.

The turbomachine regime is defined more by its operating parameters than by the power required during taxiing/stopped steps. The result is intensive use of the throttle and the brakes. This type of control is unpleasant for the pilot and uncomfortable for the passengers.

PRESENTATION OF THE INVENTION

The invention discloses a propulsion unit, particularly for an aircraft, comprising a turbomachine, a propeller that can be selectively coupled to said turbomachine, a rotary electrical machine that can drive at least the turbomachine, and means of selective coupling of the rotary electrical machine to the propeller and/or the turbomachine, that can couple the propeller only to the rotary electrical machine during a defined operation step of the propulsion unit, in which the turbomachine consists of a free turbine turboprop, comprising a gas generator and a free turbine driven in rotation by the gas flow generated by the gas generator, characterised in that the selective coupling means are capable of coupling or not coupling the rotary electrical machine to the gas generator and/or the free turbine.

Direct coupling of the rotary electrical machine to the propeller only makes it possible to use electrical energy only, and only when the aircraft has to be displaced. Therefore there is no consumption when the aircraft is stopped and also there is no exhaust gas produced since the turbomachine can be stopped.

Preferably, the selective coupling means comprise a coupling device that is permanently coupled to the rotary electrical machine and a clutch system for selective coupling of the coupling device to the propeller depending on the operating phase of the propulsion unit.

Preferably, the coupling means comprise a second clutch system, for selective coupling of the coupling device to the gas generator.

Preferably, the coupling device supports a shaft that can be coupled to the free turbine though a dog clutch.

Preferably, the rotary electrical machine consists in an alternator-starter that can generate driving energy to drive the propeller and/or the turbomachine and that can generate electricity from the driving energy produced by the turbomachine.

Preferably, the rotary electrical machine is connected to an electrical energy accumulator and the rotary electrical machine is capable of drawing electricity from or supplying electricity to said energy accumulator.

The invention also discloses a method of controlling coupling means of a propulsion unit according to the invention that is installed on an aircraft, characterised in that it consists of controlling the coupling means so that the coupling device is only coupled to the propeller during a taxiing step of the aircraft on a runway and so that the coupling device is coupled to the propeller and the turbomachine at least when the turbomachine operates in a steady state.

Preferably, during a step in which the turbomachine is started after said taxiing step, the method comprises
  a first phase in which the coupling device is coupled to the propeller and the gas generator simultaneously, and in which the coupling device is uncoupled from the free turbine;
  a second phase in which the coupling device is coupled to the gas generator only, and in which the coupling device is uncoupled from the propeller and the free turbine, and;
  a third phase in which the coupling device is coupled to the propeller and the free turbine simultaneously, and in which the coupling device is uncoupled from the gas generator.

Preferably, during a step in which the turbomachine is started, the method comprises
  a phase in which the coupling device is coupled to the gas generator, and in which the coupling device is uncoupled from the propeller and the free turbine;
  a phase in which the coupling device is coupled to the propeller and the free turbine simultaneously, and in which the coupling device is uncoupled from the gas generator.

BRIEF DESCRIPTION OF THE DRAWINGS

Other characteristics and advantages of the invention will become clear after reading the detailed description given below which will be understood more easily with reference to the appended figures among which

DETAILED PRESENTATION OF PREFERRED EMBODIMENTS

Figure 1:
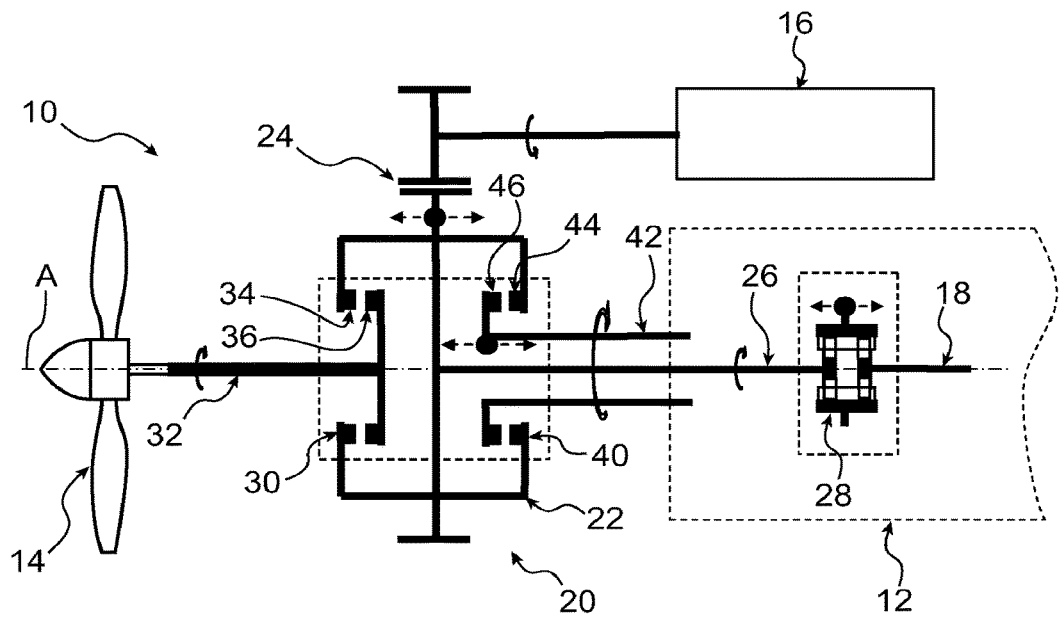
FIGS. 1 to 6 are diagrammatic representations of a propulsion unit according to the invention, showing different operating steps of the propulsion unit.

The figures show a propulsion unit 10, for example for an aircraft, that comprises a turbomachine 12 generating driving energy for the propulsion unit 10, a propeller 14 that will be driven by the turbomachine for propulsion of the aircraft, and a rotary electrical machine that is connected to an electrical energy accumulator such as a battery.

The rotary electrical machine 16 is an alternator-starter type of reversible electrical machine. It is capable of generating driving power from electricity stored in the battery that can be transmitted to the turbomachine 12 when it is operating in starter mode.

The rotary electrical machine 16 is also capable of receiving at least part of the driving energy generated by the turbomachine 12 when it is in alternator mode, to generate electricity that will be redistributed to the entire aircraft and to the battery.

The turbomachine 12 is preferably a free turbine turboprop that comprises a gas generator composed of one or several compressors and one or several turbines with one or several stages and that comprises a free turbine that drives a drive shaft 18 of the propeller 14.

A reduction gear (not shown) is placed between the shaft 18 of the turbine and the propeller 14 to reduce the rotation speed of the propeller 14.

The propulsion unit 10 also comprises coupling means 20 for selectively coupling the turbomachine 12, the propeller 14 and the rotary electrical machine 16 to each other.

The coupling means 20 comprise a coupling device 22 mounted free to rotate about a principal axis A that is permanently coupled to the rotary electrical machine 16 through a set of gears 24.

The coupling device 22 includes a shaft 26 that will or will not be coupled to the shaft 18 of the free turbine though a dog clutch 28.

The dog clutch 28 can be in two different states, namely an engaged coupling state of the shaft 26 of the coupling device 22 to the shaft 18 of the free turbine, and a disengaged state in which it does not couple the two shafts 26, 18 together. The state of the dog clutch can be modified depending on the operating phase of the propulsion unit, as will be described later.

The coupling means 20 comprise a first clutch system 30 connecting the coupling device 22 with a propeller 14 supporting shaft 32. The first clutch system 30 is capable of occupying one state among the engaged, disengaged and slipping states, for rotational coupling or uncoupling of the coupling device 22 to the propeller 14 supporting shaft 32.

The first clutch system 30 comprises a first planar ring 34 fixed in rotation with the coupling device 22 and a second planar ring 36 facing it fixed in rotation to the propeller 14 supporting shaft 32. The two planar rings 34, 36 of the first clutch system 30 will or will not come into contact with each other, depending on whether the first clutch system is in one of its states defined above.

The coupling means 20 comprise a second clutch system 40 connecting the coupling device 22 to a gas generator shaft 42. The second clutch system 40 is capable of occupying one state among the engaged, disengaged and slipping states, for rotational coupling or uncoupling of the coupling device 22 to the gas generator shaft 42.

The second clutch system 40 comprises a first planar ring 44 fixed to the coupling device 22 in rotation and a second planar ring 46 fixed in rotation to the gas generator shaft 42.

The two planar rings 44, 46 of the second clutch system 40 will or will not come into contact with each other, depending on whether the second clutch system is in one of its states defined above.

The coupling means 20 also comprise control and drive means for the dog clutch 28 and clutch systems 30, 40 to provoke or not provoke coupling of the turbomachine 12, the propeller 14 and the rotary electrical machine 16 to each other.

The propulsion unit is designed so that in one configuration of the coupling means 20, the rotary electrical machine 16 is coupled to the propeller 14 only. In this configuration of the coupling means 20, the rotary electrical machine 16 and the propeller 14 are not coupled to the gas generator nor with the free turbine of the turbomachine 12.

This configuration of the coupling means 20 is preferably used when the aircraft is operating in a taxiing step, so that there is no need to use the power of the turbomachine 12, and the turbomachine 12 can even be kept in the stopped state.

This makes it possible to drive the propeller 14 without consuming fuel nor producing exhaust gas. The electrical energy used to rotate the propeller 14 is only used when it is necessary, therefore there is no excessive consumption of electricity.

The following description will describe several operating steps of the propulsion unit 10 comprising the coupling means 20 that have just been described.

Taxiing Step

Figure 2:
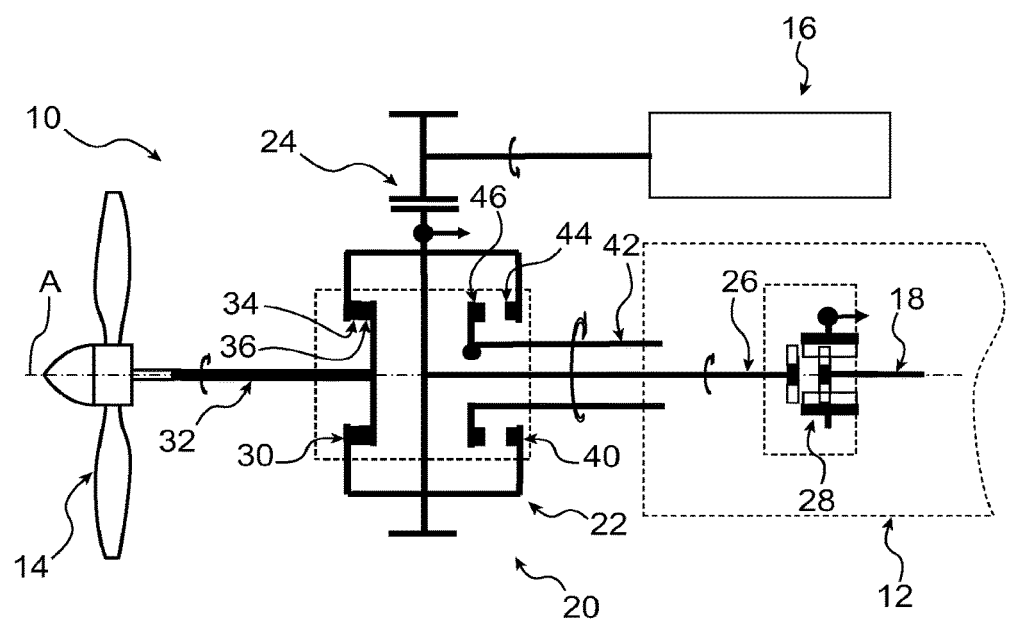

FIG. 2 shows the configuration of the propulsion unit 10 when the aircraft is operating in a taxiing step.

As mentioned above, during this taxiing step, the coupling means 20 couple only the rotary electrical machine 16 to the propeller 14.

In this configuration of the coupling means 20, the dog clutch 28 is in a disengaged state in which it does not couple the shaft 26 of the coupling device 22 to the free turbine shaft 18. Therefore the rotary electrical machine 16 is not coupled to the free turbine of the turbomachine 12.

The first clutch system 30 is in the engaged position, in other words the two planar rings 34, 36 are in contact with each other and the second clutch system 40 is in the disengaged position, in other words the two planar rings 44, 46 are not in contact with each other.

Also, in this configuration of the coupling means 20, the rotary electrical machine 16 operates in starter mode, in other words it produces driving energy and this driving energy is transmitted to the propeller only through the coupling device 22 and the first clutch system 30.

Figure 3:
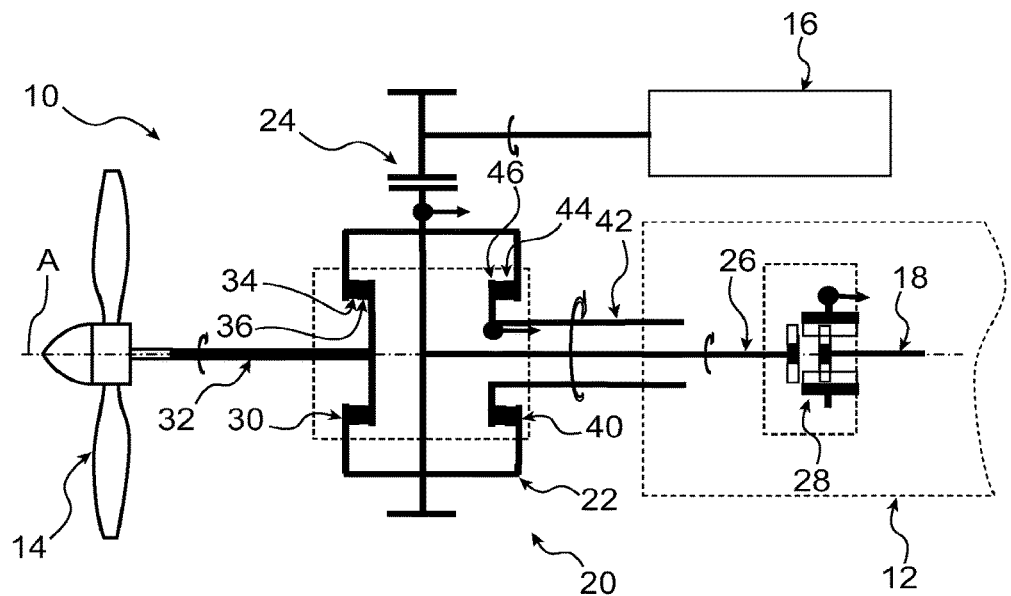
Figure 4:
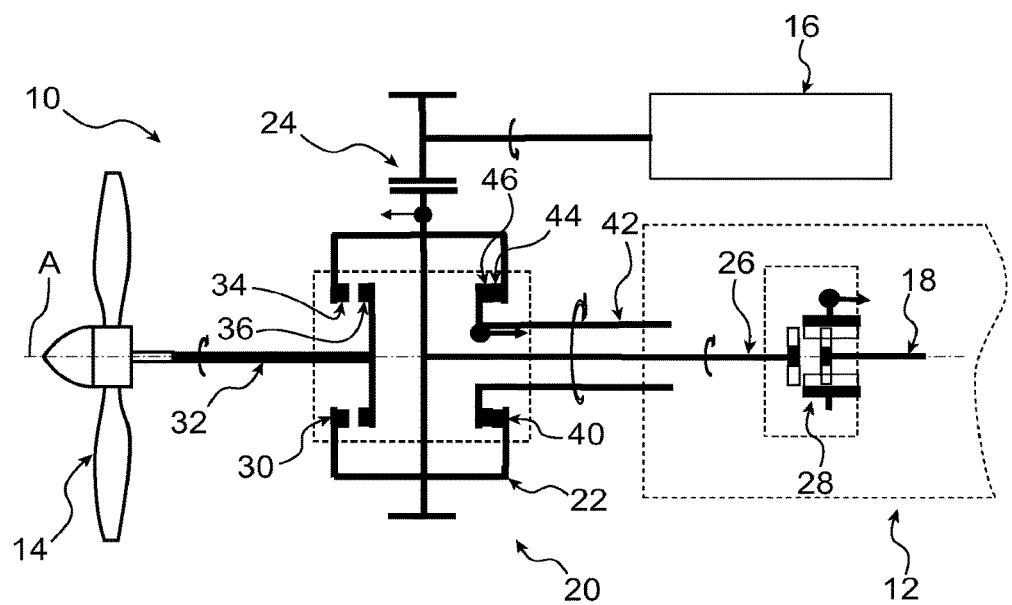
Figure 5:
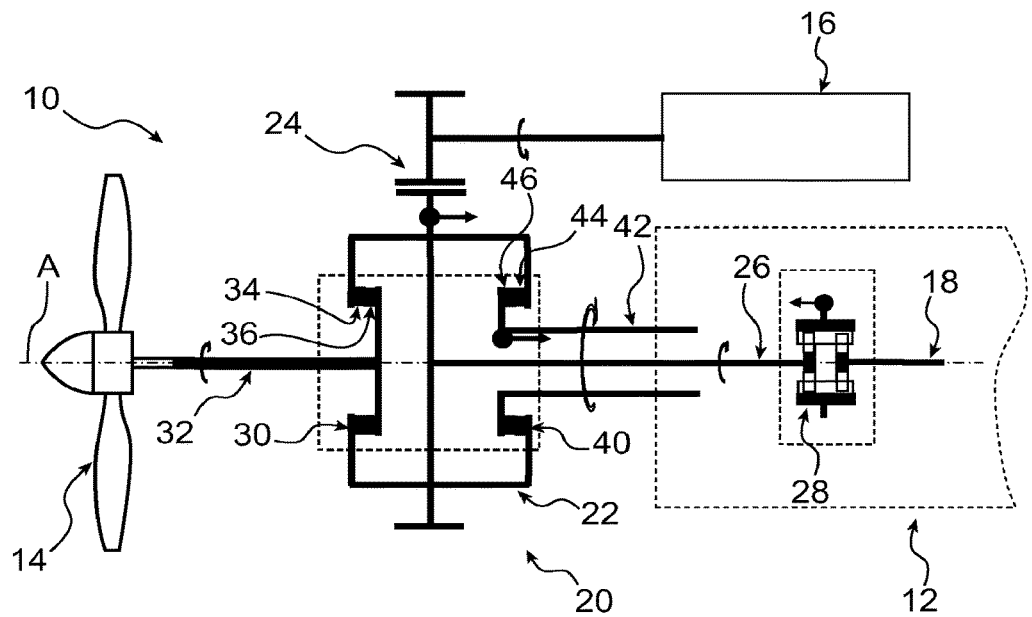

FIGS. 3 to 5 show other states of the propulsion unit 10 and its coupling means 20, representing the different operating phases of the coupling means 20 during a step to start the turbomachine that is implemented after the taxiing step.

Starting the turbomachine 12 consists mainly of rotating the gas generator until it reaches an operating speed of the turbomachine. Starting from this operating speed, the free turbine generates driving energy that can be transmitted to the propeller.

Coupling of the Propeller and the Electrical Machine to the Gas Generator

In a first phase of the start up step that takes place immediately after the taxiing phase, the gas generator is coupled to the rotary electrical machine 16 and to the propeller 14.

In the previous taxiing step, the propeller 14 is rotating at high speed. Coupling of the gas generator to the propeller 14 makes it possible to use the kinetic energy stored by the propeller 14 to participate in driving the gas generator.

To achieve this, as shown on FIG. 3, the second clutch system 40 changes state to its engaged state, in other words the two planar rings 44, 46 are brought into contact to each other. The gas generator is then coupled to the coupling device 22.

The dog clutch 28 and the first clutch system 30 are held in the same state as before, in other words the dog clutch 28 is in a disengaged state and the first clutch system 30 is in the engaged position.

The rotary electrical machine 16 operates in driving energy production mode, and this energy and the kinetic energy of the propeller 14 are transmitted to the gas generator to start the turbomachine 12.

Coupling of the Electrical Machine to the Gas Generator

After a certain time, the kinetic energy of the propeller 14 is no longer sufficient to participate in driving the gas generator to start the turbomachine 12. The propeller 14 can also produce a resisting torque that would uselessly consume a certain quantity of energy generated by the rotary electrical machine 16.

This configuration can also be used at the beginning of starting the turbomachine 12. When the taxiing phase described above does not occur, the propeller 14 is not moving and therefore cannot participate in driving the gas generator.

Consequently, as can be seen on FIG. 4, in this phase of the starting step, the propeller 14 is uncoupled from the rotary electrical machine and the gas generator.

To achieve this, the first clutch system 30 changes state to its disengaged state, in other words the two planar rings 34, 36 are no longer in contact with each other.

Consequently, in this phase, the rotary electrical machine is coupled only to the gas generator, all the energy produced by the rotary electrical machine 16 is used to start the turbomachine, therefore there is no loss of energy caused by the resisting torque of the propeller 14.

Coupling of the Free Turbine to the Coupling Device

Finally, in a third phase of the start-up step, shown in FIG. 5, the turbomachine 12 is started, and the free turbine is capable of producing driving energy.

In this phase, the rotary electrical machine 16 is coupled to the propeller 14 and to the free turbine and is uncoupled from the gas generator.

To achieve this, the first clutch system 30 changes state to its engaged state, in other words the two planar rings 34, 36 are in contact with each other and the propeller 14 is then coupled to the rotary electrical machine 16 through the coupling device 22.

The dog clutch 28 also changes to its engaged state coupling the free turbine shaft 18 to the shaft 26 of the coupling device 22, to couple the rotary electrical machine 16 to the free turbine.

The second clutch system 40 is kept in the engaged position.

The energy produced by the free turbine drives the propeller 14 and the rotary electrical machine 16, that then functions in electricity generation mode. Thus, the propulsion unit 10 can both start the aircraft movement and generate electricity that is redistributed to the entire aircraft, including to the battery.

Operation Under Steady State

Figure 6:
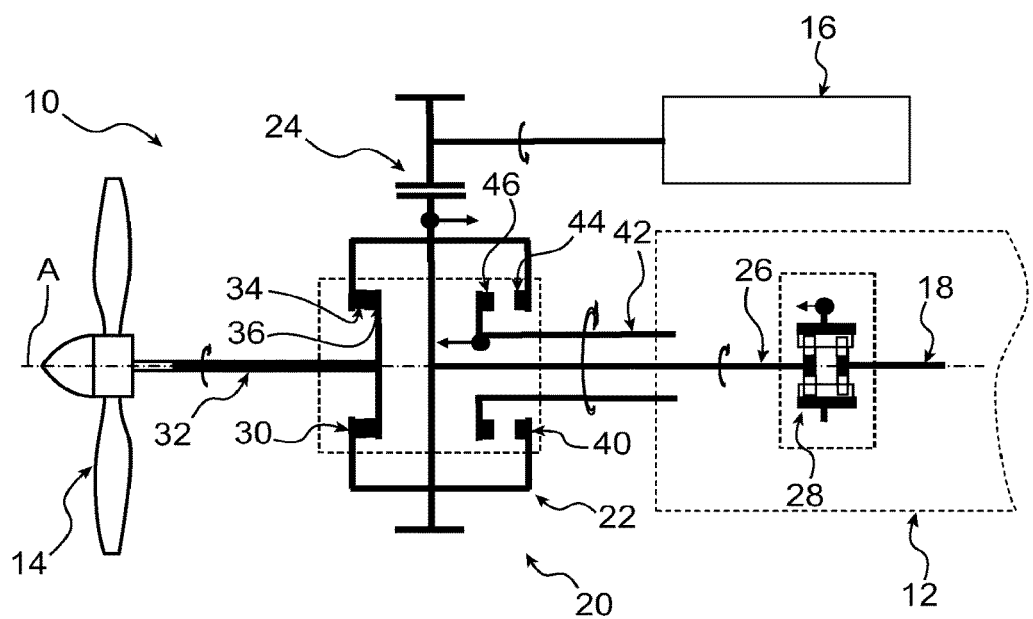

FIG. 6 shows the state of the propulsion unit 10 when the turbomachine 12 is in operation.

This state of the propulsion unit 10 corresponds to the aircraft takeoff, flight, and landing phases.

In this state of the propulsion unit 10, the coupling means 20 couple the rotary electrical machine 16 to the free turbine shaft 18 of the free turbine and to the propeller. On the other hand, in this state, the coupling means 20 do not couple the rotary electrical machine 16 to the gas generator.

In this case too, the energy produced by the free turbine drives the propeller 14 and the rotary electrical machine 16, that functions in electricity generation mode.

To achieve this, in the same way as for the state shown in FIG. 5, the first clutch system 30 is in its engaged state, in other words the two planar rings 34, 36 are in contact with each other and the propeller 14 is coupled to the rotary electrical machine 16.

The dog clutch 28 is in its engaged state coupling the free turbine shaft 18 to the shaft 26 of the coupling device 22, to couple the rotary electrical machine 16 to the free turbine.

On the other hand, the second clutch system 40 is in the disengaged position, in other words the two planar rings 44, 46 are not in contact with each other, therefore the rotary electrical machine 16 is not coupled to the gas generator.

In the above description of the propulsion unit 10, the propeller 14 and its associated shaft 32, the shaft 18 of the free turbine, the coupling device 22, the dog clutch 28 and the gas generator shaft 42 are all coaxial with the principal axis A. It will be understood that the invention is not limited to this embodiment and that the principal axis of one or several of these components may be offset from or inclined relative to the principal axis A. The propulsion unit will then comprise appropriate redirecting means.

The invention claimed is:

1. A propulsion unit, comprising:
    a turbomachine;
    a propeller that can be selectively coupled to said turbomachine;
    a rotary electrical machine that can drive at least the turbomachine, and
    means of selective coupling of the rotary electric machine to at least one of the propeller or the turbomachine, that can couple the propeller only to the rotary electrical machine during a defined operation step of the propulsion unit,
    wherein the turbomachine includes a free turbine turboprop, comprising a gas generator and a free turbine driven in rotation by the gas flow generated by the gas generator, and
    wherein the selective coupling means comprise
        a first clutch system to only couple the propeller to the rotary electrical machine during one defined operating phase of the propulsion unit, and
        a second clutch system to only couple the turbomachine to the rotary electrical machine during another defined operating phase of the propulsion unit.

2. The propulsion unit according to claim 1, wherein the selective coupling means further comprise a coupling device that is permanently coupled to the rotary electrical machine.

3. The propulsion unit according to claim 2, wherein the coupling device supports a shaft that can be coupled to the free turbine through a dog clutch.

4. The propulsion unit according to claim 1, wherein the rotary electrical machine includes an alternator-starter that can generate driving energy to drive at least one of the propeller or the turbomachine and that can generate electricity from the driving energy produced by the turbomachine.

5. The propulsion unit according to claim 4, wherein the rotary electrical machine is connected to an electrical energy accumulator and the rotary electrical machine is capable of drawing electricity from or supplying electricity to said energy accumulator.

6. A method of control over the selective coupling means of the propulsion unit according to claim 2, installed on an aircraft, the method comprising:

controlling the selective coupling means so that the coupling device is only coupled to the propeller during taxiing step the aircraft on a runway and so that the coupling device is coupled to the propeller and the turbomachine at least when the turbomachine operates in a steady state.

7. The method of control according to claim 6, further comprising during a starting of the turbomachine following said taxiing:
   a first phase in which the coupling device is coupled to the propeller and the gas generator simultaneously, and wherein the coupling device is uncoupled from the free turbine;
   a second phase in which the coupling device is coupled to the gas generator only, and wherein the coupling device is uncoupled from the propeller and the free turbine, and
   a third phase wherein the coupling device is coupled to the propeller, and the free turbine simultaneously.

8. A method of control over the selective coupling means of the propulsion unit according to claim 2, installed on an aircraft, the method comprising during a step in which the turbomachine is started:
   a phase wherein the coupling device is coupled to the gas generator only, and in which the coupling device is uncoupled from the propeller and the free turbine, and
   a phase wherein the coupling device is coupled to the propeller and the free turbine simultaneously, and in which the coupling device is uncoupled from the gas generator.

* * * * *